(No Model.)

E. L. POST.
FISH HOOK EXTRACTOR.

No. 400,112. Patented Mar. 26, 1889.

WITNESSES:
C. Neveux
C. Sedgwick

INVENTOR:
E. L. Post
BY Munn &Co
ATTORNEYS.

UNITED STATES PATENT OFFICE.

EZRA L. POST, OF NEW YORK, N. Y.

FISH-HOOK EXTRACTOR.

SPECIFICATION forming part of Letters Patent No. 400,112, dated March 26, 1889.

Application filed September 14, 1888. Serial No. 285,384. (No model.)

*To all whom it may concern:*

Be it known that I, EZRA L. POST, of the city, county, and State of New York, have invented a new and Improved Disgorger, of which the following is a full, clear, and exact description.

The object of this invention is to provide a reliable device for removing a hook from the stomach or gullet of a fish; and the invention consists in the device which will be hereinafter specially set forth and claimed.

Reference is to be had to the accompanying drawings, forming a part of this specification, in which similar letters of reference indicate corresponding parts in all the figures.

Figure 1:
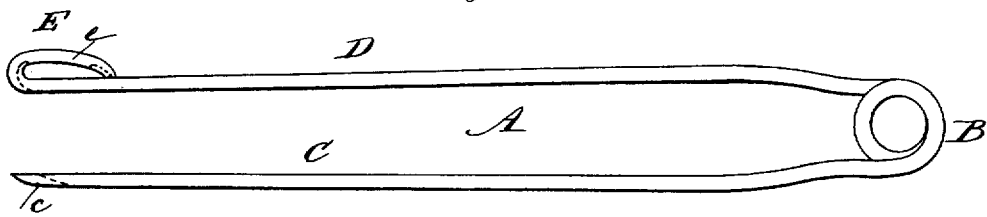
Figure 2:
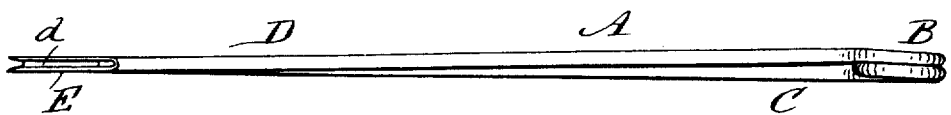
Figure 3:
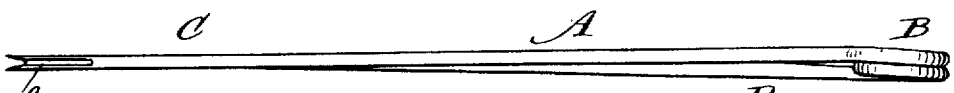
Figure 5:
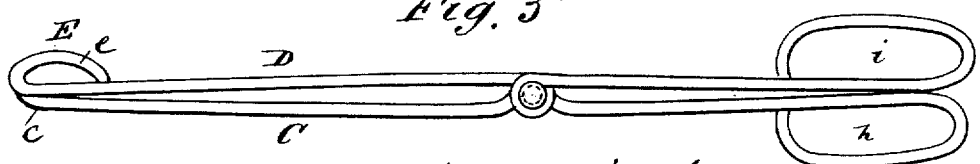
Figure 4:
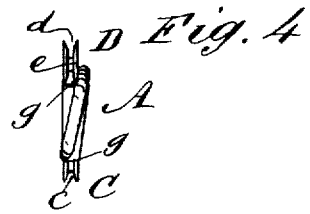

Figure 1 is a side view of the device. Fig. 2 is an edge view of the same. Fig. 3 is a view of the same looking at the opposite edge. Fig. 4 is an end view, and Fig. 5 illustrates a modification.

The device consists, essentially, of a two-armed tongs, one arm of which acts as a follower on the line and the other as a disengager for the hook.

The device A is preferably made from a piece of spring-wire centrally bent and provided with a coil, B, at the bend, from which the arms C D extend in parallel lines. The arm C is grooved on the outer side near the end, and on the end, at $c$, as shown in Fig. 3 and by dotted lines in Fig. 1. The end of the arm D is bent upon itself and then curved inward toward the body of the arm to form the closed hook or elongated eye E. A groove, $d$, beginning at the bend of the arm D and aligning the groove in the arm C, extends along the outer face of the hook E, and centrally of said outer face is deepened to preferably extend through the body of the wire and form the open slot or pocket $e$ therein.

The meeting faces of the arms C D at the end thereof are flattened, as at $g$, Fig. 4, to insure alignment of the grooves $c$ $d$; but any other contour of the meeting faces at this point may be adapted to secure their alignment.

In Fig. 5 is illustrated a modified form, in which the arms C D are made separate and pivoted together similar to a pair of scissors. For large hooks this form will be preferable, as being easy to operate by passing the thumb and fore-finger through the loops $h$ $i$.

The device is grasped between the thumb and forefinger of the right hand, and the arms C D pressed together, the fish being held by the left hand or otherwise. The groove at ends of the arms and on the side of arm C is then engaged with the line and the device pushed down the throat of the fish along the line. On reaching the hook, by a slight increase of inward pressure the hook can then be disengaged, and by immediately allowing the arms C D to open the point and barb of the hook will enter the slot $e$ in the arm D, when the device with the line and hook can be withdrawn. The point of the fish-hook, being covered and protected by the pocket in the eye E, cannot catch again.

Having thus fully described my invention, I claim as new and desire to secure by Letters Patent—

1. A disgorger consisting of a two-armed tongs one of the arms of which is grooved at the end and the other bent upon itself and grooved at the end and along the bend, substantially as shown and described.

2. A disgorger consisting of two united arms one of which is grooved at the end and the other of which is bent upon itself at the end to form an eye and grooved along the outer face of said eye, said groove being deepened centrally of said face, substantially as shown and described.

3. A disgorger consisting of the arm C, having grooved end, and the arm D, having grooved eye E, provided with the pocket $e$, substantially as shown and described.

EZRA L. POST.

Witnesses:
GEORGE C. WING,
FRANK F. DOYLE.